United States Patent [19]
Morita et al.

[11] Patent Number: 5,898,714
[45] Date of Patent: Apr. 27, 1999

[54] OPTICAL PULSE GENERATOR

[75] Inventors: Itsuro Morita; Noboru Edagawa; Masatoshi Suzuki; Shu Yamamoto; Shigeyuki Akiba, all of Tokyo, Japan

[73] Assignee: Kokusai Denshin Denwa Kabushiki Kaisha, Tokyo, Japan

[21] Appl. No.: 08/783,589

[22] Filed: Jan. 13, 1997

[30]    Foreign Application Priority Data

Jan. 18, 1996  [JP]  Japan .................................. 8-006410

[51] Int. Cl.$^6$ ........................................................ H01S 3/30
[52] U.S. Cl. .................................. 372/6; 372/25; 372/70
[58] Field of Search ................................ 372/6, 25, 70

[56]          References Cited

U.S. PATENT DOCUMENTS

| | | | |
|---|---|---|---|
| 5,434,693 | 7/1995 | Tanaka et al. | 359/180 |
| 5,659,558 | 8/1997 | Tohmon et al. | 372/6 |
| 5,737,460 | 4/1998 | Damen et al. | 372/6 |

FOREIGN PATENT DOCUMENTS 281896  10/1994  Japan .

OTHER PUBLICATIONS

Morita et al., "Pre-emphasis Optical Soliton Compression Using DDF", The Institute of Electronics, Information and Communications Society Symposium 1995, p. 398.

*Primary Examiner*—Leon Scott, Jr.
*Attorney, Agent, or Firm*—Christie, Parker & Hale, LLP

[57]          ABSTRACT

An optical pulse generator, capable of generating ultrashort optical pulses suitable for optical soliton transmission, includes a DFB laser 10 for continuous laser oscillation, an electroabsorbtion modulator 12 for creating a sequence of optical pulses of the pulse width 14.6 ps from optical output of the laser 10. Output from an optical modulator 12 enters into a dispersion decreasing fiber 16 via an optical isolator 14. The dispersion decreasing fiber 16 has chromatic dispersion that decreases from 13.7 ps/nm/km to 2.3 ps/nm/km with distance, and its fiber length is 15 km. Pump laser beams from pump lasers 20, 24 are introduced to the dispersion decreasing fiber 16 by optical couplers 18, 22, and the fiber 16 functions as a Raman amplifier. When the Raman gain is 2.4 dB, the pulse width is compressed from 14.6 ps to 5.8 ps, approximately, even when the power of input pulses to the dispersion decreasing fiber 16 complies with the soliton condition.

6 Claims, 3 Drawing Sheets

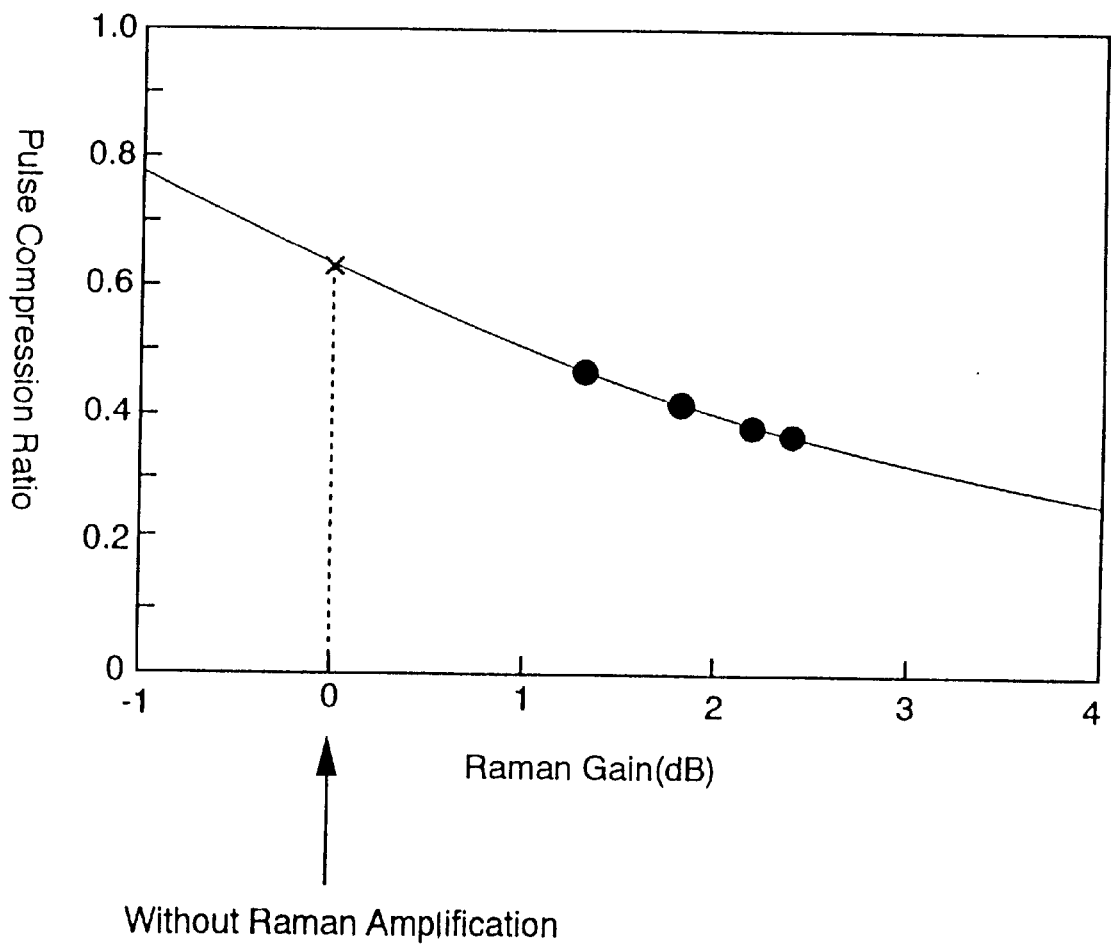

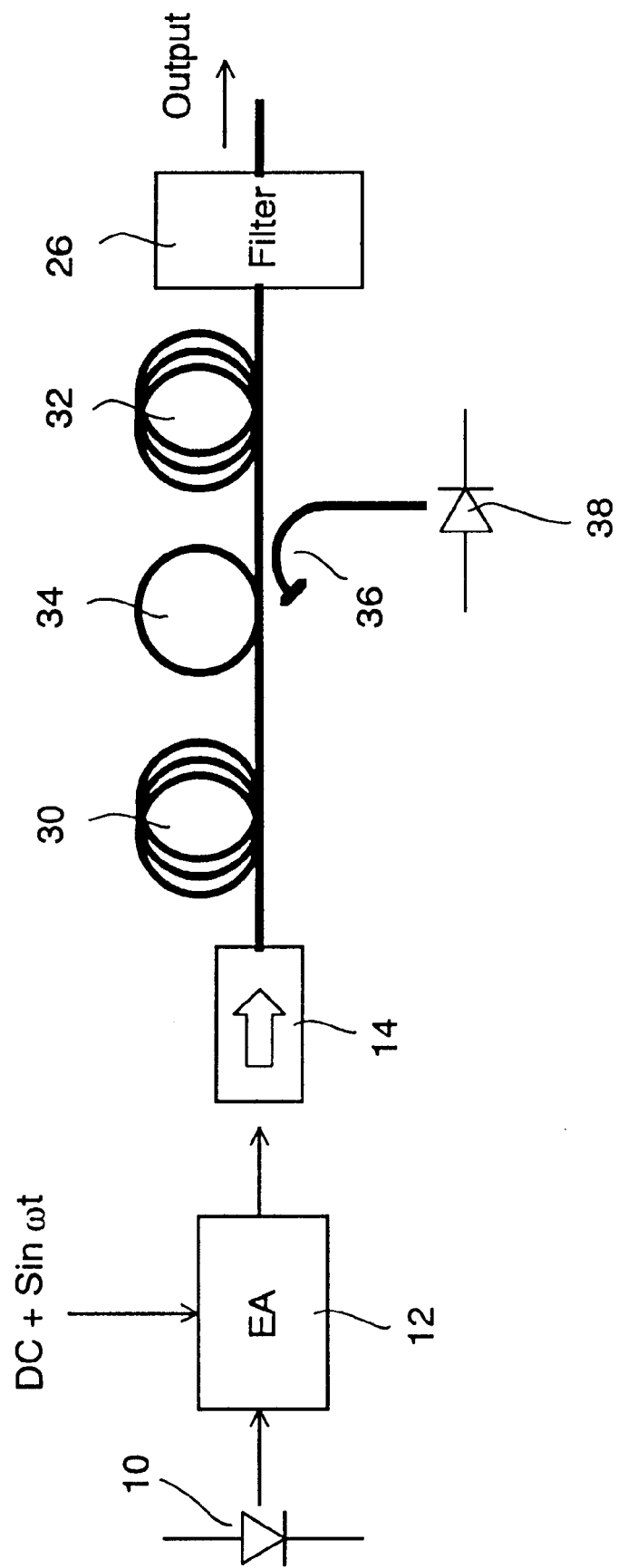

OPTICAL PULSE GENERATOR

FIELD OF THE INVENTION

This invention relates to an optical pulse generator and, more particularly, to an optical pulse generator capable of generating ultrashort optical pulses suitable for optical soliton transmission.

BACKGROUND OF THE INVENTION

High-speed optical soliton transmission using bit rates of decades of gigabits per second or more needs ultrashort optical pulses shorter than 10 ps. Optical pulses having a pulse width of 10 ps or more can relatively easily be generated by a method of driving a semiconductor laser with short pulses or by a method using an electroabsorbtion modulator as an optical gate to transmit a continuous wave light for a short time. With these methods, however, it is difficult to obtain ultrashort optical pulses in the order of several picoseconds required for high-speed optical soliton transmission. As means for compressing the pulse width of optical pulses having an ordinary pulse width, a Dispersion Decreasing Fiber is well known(for example, Morita et al., "Pre-emphasis Optical Soliton Compression Using DDF", The Institute of Electronics, Information and Communication, Digest for the Communications Society Symposium 1995, p. 398).

Dispersion decreasing fibers are optical fibers whose chromatic dispersion values decrease with transmission distance. Such optical fibers exhibit, for example, chromatic dispersion of 12 ps/nm/km to 14 ps/km/nm at their input ends but 1 ps/km/nm to 2 ps/nm/km at their output ends in the wavelength band of 1,500 nm which is regarded useful for long-distance optical transmission.

Japanese Patent Laid-Open No. 6(1994)-281896 discloses an optical pulse generator for generating ultrashort optical pulses usable for optical soliton transmission. This generator uses serially connected two electroabsorbtion modulators that are driven in phases different by 180 degrees to generate ultrashort pulses around 2 ps. This prior art, however, involves difficulties in practical use, such as wide spectral width.

The peak power and the soliton distance required for optical soliton transmission are theoretically given by the following equations. The soliton distance pertains to a transmission distance for characterizing solitons.

The peak power Psol (fundamental soliton) is:

$$Psol = 0.776(\lambda^3 A_{eff} D)/(n^2 c n_2 t^2) \qquad (Eq.1)$$

where $\lambda$ is the signal wavelength (m), $A_{eff}$ is the effective core area (m$^2$), D is the chromatic dispersion value (s/m$^2$), c is the speed of light (3.0*10$^8$ m/s), $n_2$ is the nonlinear refractive index (m$^2$/W), and t is the pulse width (s).

The soliton distance $z_0$ is:

$$z_0 = 0.322(n^2 c/\lambda^2)(t^2/D) \qquad (Eq.2)$$

where $\lambda$ is the signal wavelength (m), D is the chromatic dispersion value (s/m$^2$), c is the speed of light (3.0*10$^8$ m/s), and t is the pulse width (s).

In case of optical soliton pulses, since the product of the energy E and the pulse width t is proportional to the chromatic dispersion D, the pulse width t can be decreased by decreasing the chromatic dispersion D amply slowly (adiabatically) in the propagating direction by a ratio larger than the decrease in energy due to the propagation loss. Dispersion decreasing fibers use this theory. Note here that the pulse width compression ratio is equal to the decreasing ratio of the chromatic dispersion D under an ideal condition with no propagation loss; however, if any optical loss a exists, then the pulse width compression ratio becomes a value obtained by multiplying the chromatic dispersion decreasing ratio by exp(aL) where L is the fiber length.

The conventional device combining a pulse-driven semiconductor laser and a dispersion decreasing fiber is subject to variations in laser oscillating frequency due to the pulsative activation of the laser, which results in broadening the spectrum width of the optical pulse too much. To cope with the problem, the conventional device uses a narrow band optical filter to remove undesired frequency components. This approach, however, involves the disadvantage that pulse widths are limited by the band width of the narrow band optical filter. Additionally, it is almost impossible to fully remove varieties in oscillating frequency due to direct modulation of the semiconductor laser.

In devices combining an electroabsorbtion modulator and a dispersion decreasing fiber, for example, optical pulses of 14.6 ps produced by the electroabsorbtion modulator can be compressed to 8 ps by introducing them to a 15 km-long dispersion decreasing fiber whose dispersion decreases from 13.7 ps/nm/km to 2.3 ps/nm/km. For this purpose, however, the input power to the dispersion decreasing fiber is up to or beyond a value satisfying the soliton condition. That is, since the pulse width of optical pulses introduced to the dispersion decreasing fiber is relatively wide, as wide as 14.6 ps, the soliton length becomes long, and the length of the dispersion decreasing fiber also becomes long, as understood from Eq. 2. As a result, the propagation loss increases. In order to compensate the propagation loss, the conventional device increases the peak power of input optical pulses to the dispersion decreasing fiber beyond the theoretical value obtained from Eq. 1, and hence results in a mode of use which does not meet the soliton condition.

Unless the soliton condition is satisfied, the time waveform and the spectral shape of optical pulses are distorted unacceptably for use in optical soliton transmission. In contrast, if the soliton condition is satisfied, then the pulse width compression effect by the dispersion decreasing fiber is restricted.

SUMMARY OF THE INVENTION

It is therefore an object of the invention to provide an optical pulse generator that overcomes the problems involved in conventional devices and can generate ultrashort pulses satisfying the soliton condition.

Another object of the invention is to provide an optical pulse generator for generating ultrashort pulses satisfying the soliton condition over a wide range of pulse widths.

According to the invention, a pulse width is compressed by a dispersion decreasing fiber whose loss is substantially reduced by pumping the dispersion decreasing fiber by optical pumping means or by interposing optical amplifying means in the dispersion decreasing fiber. By reducing the loss to make an ideal condition with no loss, for example, the power of input pulses to the dispersion decreasing fiber can be equaled to a value that satisfies the soliton condition and the generation of sufficiently short optical pulses is enabled. Therefore, ultrashort pulses suitable for optical soliton transmission are generated.

When the dispersion decreasing fiber functions as a Raman amplifying element, the transmission loss can be decreased substantially uniformly throughout the entire length of the dispersion decreasing fiber. This is more advantageous to comply with the soliton condition. Also, the broadening of pulse width due to the transmission loss is suppressed and hence a higher pulse compression ratio is attained.

Pumping light may be introduced from opposite sides of the dispersion decreasing fiber to reduce the propagation loss of the dispersion decreasing fiber. In this case, output power from first and second optical pumping means may be small.

By using a laser element for continuously oscillating at a single wavelength and optical gate means, optical pulses with a time waveform and spectral shape that are suitable for pulse compression by the dispersion decreasing fiber can be generated.

BRIEF DESCRIPTION OF THE DRAWINGS

FIG. 2 is a diagram showing pulse compression ratio versus Raman amplification gain according to the embodiment; and FIG. 3 is a block diagram showing a general construction of another embodiment of the invention.

DESCRIPTION OF THE PREFERRED EMBODIMENTS

Figure 1:
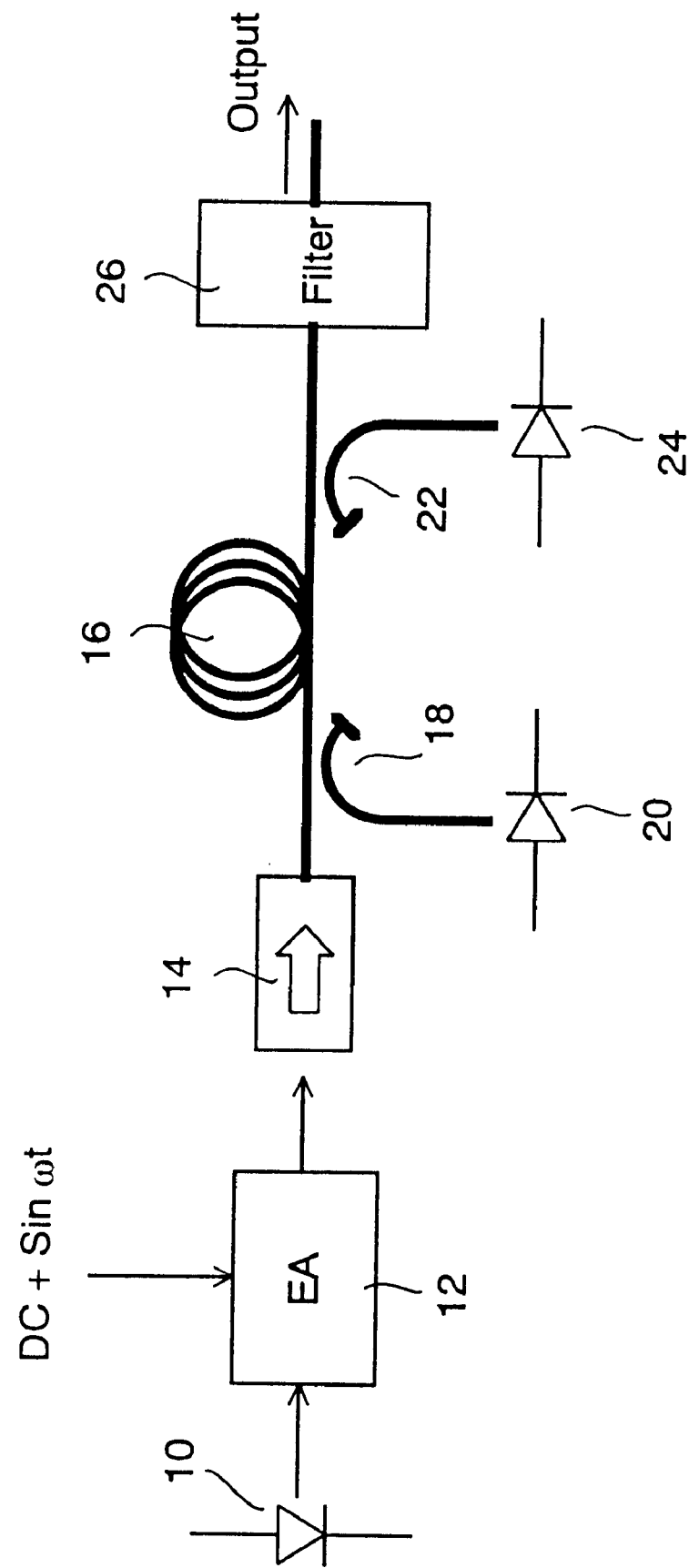
FIG. 1 is a block diagram showing a general construction of an embodiment of the invention.

Embodiments of the invention are described below in detail with reference to the drawings. FIG. 1 is a block diagram showing a general construction of one of the embodiments. Numeral 10 denotes a DFB semiconductor laser for continuously oscillating at a single wavelength of 1,558 nm. Output light from the semiconductor laser 10 is introduced to an electroabsorbtion modulator 12 made of InGaAsP. The electroabsorbtion modulator 12 is driven by a sinusoidal wave biased by a DC voltage to produce a sequence of optical pulses of the pulse width of 14.6 ps from the continuous light from the semiconductor laser 10. Intervals of the optical pulses depend on the frequency of the sinusoidal wave applied to the electroabsorbtion modulator 12. Construction and behaviors of the electric absorptive modulator 12 are known.

Output light from the modulator 12 is introduced to a dispersion decreasing fiber 16 via an optical isolator 14. The dispersion decreasing fiber 16 used in the embodiment is designed such that its chromatic dispersion decreases from 13.7 ps/nm/km to 2.3 ps/nm/km, and its fiber length is 15 km.

In the present embodiment, a continuous wave light of 1,400 nm to 1,500 nm (more specifically, 1,480 nm) is introduced into the dispersion decreasing fiber 16 to make it behave as a Raman amplifier. For this purpose, an optical coupler (WDM optical fiber coupler) 18 is connected with the input end of the dispersion decreasing fiber 16 (or to an optical fiber if such optical fiber is used to connect the optical isolator 14 with the dispersion decreasing fiber 16) to introduce a laser beam output from a pump laser 20 to the dispersion decreasing fiber 16. The pump laser 20 is a high-power semiconductor laser capable of continuous oscillation from 1,400 nm to 1,500 nm (more specifically, 1,480 nm).

The embodiment further uses an optical coupler (WDM optical fiber coupler) 22 connected with the output end of the dispersion decreasing fiber 16 to introduce a laser light output from a pump laser 24 in the opposite direction. Also the pump laser 24 is a high-power semiconductor laser for continuous oscillation from 1,400 nm to 1,500 nm (more specifically, 1,480 nm).

By using two pump lasers 20, 24, a desired gain of Raman amplification can be obtained even with small output power from the pump laser 20, 24. If a sufficient gain of Raman amplification is ensured with only one of the pump lasers 20, 24, the optical coupler 18 (or 22) and the pump laser 20 (or 24) can be omitted.

Output light from the dispersion decreasing fiber 16 is externally output through an optical filter 26 that absorbs (or reflects) light below 1,500 nm. The optical filter 26 prevents the output light of the pump lasers 20, 24 from outputting to a transmission optical fiber. The optical filter 26 may be a filter permitting the signal wavelength alone to pass through.

Since the dispersion decreasing fiber 16 also functions as a Raman amplifier in this embodiment, the transmission loss of the dispersion decreasing fiber 16 decreases. A test actually showed the pulse width being reduced from 14.6 ps to 5.8 ps, approximately, under the Raman gain of 2.4 dB. The output power of the pump laser 20 used in the test was 65 mW, and the output power of the pump laser 24 was 51 mW.

To compress 14.6 ps to 8 ps, the conventional device had to supply a power beyond the satisfactory value for the soliton condition to a dispersion decreasing fiber equivalent to the dispersion fiber 16 in the embodiment both in dispersion decreasing characteristics and in fiber length. The embodiment of the invention, however, could realize a higher compression ratio even with optical pulses having the satisfactory power for the soliton condition when entering in the dispersion decreasing fiber 16. Therefore, optical pulses generated by the embodiment of the invention satisfy the condition for optical soliton transmission, and can be used as transmission pulses in optical soliton transmission.

As explained above, when any loss exists in the dispersion decreasing fiber, the pulse compression ratio becomes a value obtained by multiplying the dispersion decreasing ratio by exp(aL). This shows that the pulse compression ratio can be changed by changing the loss coefficient a. A test resulted in values of FIG. 2 where the pulse compression ratio certainly changes with Raman gain.

In FIG. 2, changes in pulse compression ratio are shown when the Raman gain of the dispersion decreasing fiber 16 changes under the condition where the peak power of optical pulses introduced to the dispersion decreasing fiber 16 is the satisfactory value for the soliton condition. The pulse width of pulses entering into the dispersion decreasing fiber 16 was 14.6 ps. The pulse compression ratio is put on the vertical axis, and the Raman gain on the horizontal axis. Block dots indicate measured values of the pulse compression ratio obtained by utilizing Raman amplification. When the Raman gain is zero under exactly the same conditions for the other factors, the pulse compression ratio is about 0.62, and the pulse width is about 9 ps (see the point x). In other words, under the satisfactory power condition for the soliton condition, the pulse compression ratio was improved from 0.62 to 0.4, approximately, by Raman amplification.

The embodiment shown in FIG. 1 reduces the transmission loss in the dispersion decreasing fiber 16 by adding the optical amplifying function to the dispersion decreasing fiber 16 itself. With a small transmission loss, undesired broadening of pulses caused by the transmission loss also decreases, and a high pulse compression ratio is realized.

From the standpoint of reducing the loss, the dispersion decreasing fiber 16 may be divided into two parts, for example, to insert an optical amplifier between them. FIG. 3 is a block diagram of a general construction of this device. Elements in FIG. 3 equivalent to those of FIG. 1 are labeled with common reference numerals. Numerals 30 and 32 denote dispersion decreasing fibers, which lengths are respectively equal to that of the portions of binaurally divided dispersion decreasing fiber 16. That is, when the dispersion decreasing fibers 30 and 32 are connected, they make the dispersion decreasing fiber 16. Connected between the dispersion decreasing fibers 30, 32 is an erbium-doped optical fiber 34. The erbium-doped optical fiber 34 is pumped by a laser beam output from a pump laser 38 via a WDM optical fiber coupler 36 to optically amplify pulses from the dispersion decreasing fiber 30 and to deliver the amplified pulses to the dispersion decreasing fiber 32.

In the embodiment shown in FIG. 3, since the peak power of optical pulses is amplified concentrically by the fiber 34, the effect of improvement in pulse compression ratio is slightly less than the embodiment shown in FIG. 1, but it nevertheless surpasses the effects of the conventional device. This is because the erbium-doped optical fiber 34 alleviates broadening of pulse widths due to the transmission loss.

Those skilled in the art will readily understand that the invention can generate ultrashort pulses suitable for optical soliton transmission and that the invention can control the pulse compression ratio by utilizing the gain and hence can change the output pulse width as desired.

What is claimed is:

1. An optical pulse generator comprising:

optical pulse generating means for generating optical pulses of a predetermined pulse width;

a dispersion decreasing fiber supplied with said optical pulses from said optical pulse generating means and having a chromatic dispersion decreasing with transmission distance; and optical pumping means for pumping said dispersion decreasing fiber to make it behave as a Raman amplifier and to decrease the transmission loss of said dispersion decreasing fiber.

2. The optical pulse generator according to claim 1, wherein said optical pumping means includes pump light generating means for generating pump light, and optical coupler means for introducing said pump light from said pump light generating means into said dispersion decreasing fiber.

3. The optical pulse generator according to claim 1, wherein said optical pumping means includes first pump light generating means for generating pump light, first optical coupler means for introducing said pump light generated by said first pump light generating means into said dispersion decreasing fiber from one of opposite ends thereof, second pump light generating means for generating pump light, and second optical coupler means for introducing said pump light generated by said second pump light generating means into said dispersion decreasing fiber from the other of said opposite ends thereof.

4. The optical pulse generator according to one of claims 1 to 3, wherein said optical pulse generating means includes a laser element having an optical output for continuous laser oscillation of a single wavelength, and optical gate means for forming optical pulses of said predetermined pulse width from said optical output of said laser element.

5. An optical pulse generator including optical pulse generating means for generating optical pulses of a predetermined pulse width and pulse compression means for compressing the pulse width of the optical pulses output from the optical pulse generating means, wherein said pulse compression means includes two dispersion decreasing fibers whose chromatic dispersion decreases with transmission distance, and at least one optical amplifier means connecting said dispersion decreasing fibers, said dispersion decreasing fibers sharing a desired pulse compression ratio.

6. The optical pulse generator according to claim 5, wherein said optical pulse generating means includes a laser element having an optical output for continuous laser oscillation of a single wavelength, and optical gate means for forming optical pulses of said predetermined pulse width from said optical output of said laser element.

\* \* \* \* \*